United States Patent
Bastide et al.

(10) Patent No.: US 10,108,319 B2
(45) Date of Patent: *Oct. 23, 2018

(54) COGNITIVE DASHBOARD ADJUSTMENT

(71) Applicant: INTERNATIONAL BUSINESS MACHINES CORPORATION, Armonk, NY (US)

(72) Inventors: Paul R. Bastide, Boxford, MA (US); Jonathan Dunne, Waterford (IE); Liam Harpur, Dublin (IE); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,458

(22) Filed: Mar. 22, 2017

(65) Prior Publication Data

US 2018/0275844 A1 Sep. 27, 2018

(51) Int. Cl.
*G06F 3/0484* (2013.01)
*G06F 3/01* (2006.01)

(52) U.S. Cl.
CPC ............ *G06F 3/0484* (2013.01); *G06F 3/013* (2013.01)

(58) Field of Classification Search
CPC ............................... G06F 3/0484; G06F 3/013
See application file for complete search history.

(56) References Cited

U.S. PATENT DOCUMENTS

| | | | | |
|---|---|---|---|---|
| 4,595,990 A | * | 6/1986 | Garwin | A61B 3/113 708/141 |
| 4,836,670 A | * | 6/1989 | Hutchinson | A61B 3/113 351/210 |
| 4,950,069 A | * | 8/1990 | Hutchinson | A61B 3/113 351/210 |
| 4,973,149 A | * | 11/1990 | Hutchinson | A61B 3/113 351/210 |
| 5,016,282 A | * | 5/1991 | Tomono | G06F 3/013 382/117 |
| 5,231,674 A | * | 7/1993 | Cleveland | A61B 3/113 351/210 |
| 5,471,542 A | * | 11/1995 | Ragland | A61B 3/113 351/208 |
| 5,861,940 A | * | 1/1999 | Robinson | A61B 3/113 351/205 |

(Continued)

FOREIGN PATENT DOCUMENTS

EP 0497664 A1 1/1992
WO 2014107795 A1 7/2014

OTHER PUBLICATIONS

IBM: List of IBM Patents or Patent Applications Treated as Related (Appendix P), Oct. 13, 2017, Pages 1-2.

(Continued)

*Primary Examiner* — Justin R. Blaufeld
(74) *Attorney, Agent, or Firm* — Michael O'Keefe (57) ABSTRACT

A computer determines a cognitive overload of a user interacting with a visual display based on eye tracking data. The visual display includes content of the dashboard and graphical elements of the content of the dashboard. The computer adjusts the visual display by modifying the content based on determining the cognitive overload.

11 Claims, 6 Drawing Sheets

(56) References Cited

U.S. PATENT DOCUMENTS

| | | | |
|---|---|---|---|
| 6,204,828 B1* | 3/2001 | Amir | G06F 3/013 345/156 |
| 7,881,493 B1 | 2/2011 | Edwards et al. | |
| 2003/0098954 A1* | 5/2003 | Amir | A61B 3/113 351/210 |
| 2007/0091113 A1 | 4/2007 | Jones et al. | |
| 2007/0236656 A1 | 10/2007 | Jeong et al. | |
| 2010/0295774 A1 | 11/2010 | Hennessey | |
| 2011/0130956 A1 | 6/2011 | Tracton et al. | |
| 2015/0145777 A1 | 5/2015 | He et al. | |
| 2018/0034996 A1* | 2/2018 | Saitoh | H04N 1/00925 |

OTHER PUBLICATIONS

Bastide et al., Pending U.S. Appl. No. 15/712,329, filed Sep. 22, 2017, titled "Cognitive Dashboard Adjustment", pp. 1-28.

Sills et al., "Adaptive User Interface Based on Eye Tracking", Technical Disclosure Commons, Defensive Publication Series, Jan. 8, 2015, pp. 1-11, Series Art 8, http://www.tdcommons.org/dpubs_series/8?utm_source=www.tdcommons.org%2Fdpubs_series%2F8&utm_medium=PDF&utm_campaign=PDFCoverPages.

Bera, "How Colors in Business Dashboards Affect User's Decision Making", Communications of the ACM, Apr. 2016, pp. 50-57, vol. 59, No. 4.

Grance et al., The NIST Definition of Cloud Computing, Recommendations of the National Institute of Standards and Technology, Sep. 2011, pp. 1-7, Special Publication 800-145, National Institute of Standards and Technology U.S. Department of Commerce, Gaithersburg, MD U.S.

Sills et al., "Adaptive User Interface Based on Eye Tracking", Technical Disclosure Commons, Defensive Publications Series, Jan. 8, 2015, pp. 1-11, http://www.tdcommons.org/dpubs_series/8.

Mell et al., "The NIST Definition of Cloud Computing," U.S. Department of Commerce, National Institute of Standards and Technology, Sep. 2011, p. 1-7, Special Publication 800-145.

Wikipedia, "Eye tracking", https://en.wikipedia.org/wiki/Eye_tracking, printed on Mar. 22, 2017, pp. 1-14.

Higgins et al., "Eye movements when viewing advertisements", Frontiers in Psychology, Mar. 2014, vol. 5, Article 210, pp. 1-15, https://www.ncbi.nlm.nih.gov/pmc/articles/PMC3956003/pdf/fpsyg-05-00210.pdf.

* cited by examiner

Table 1 – Example of Eye Tracking Data

| User | Screen X Coordinates | Screen Y Coordinates | Fixation Count | Fixation Duration (secs) | First Fixation Time |
|---|---|---|---|---|---|
| Jane | 123 | 456 | 36 | 12 | 14:02:01 UTC |
| Alice | 386 | 876 | 45 | 34 | 15:05:56 UTC |
| John | 687 | 486 | 89 | 67 | 09:04:45 UTC |

FIG. 2B

Table 2 – Example of Cognitive Overload Table

| iDash Value Range | Action |
|---|---|
| 0 - 0.250 | No action |
| 0.251 - 0.5 | Reduce maximum colors to 3 |
| 0.501 - 0.75 | Reduce maximum colors to 1 with gradient by severity |
| 0.751 - 1.0 | Reduce maximum colors to 1 with gradient by severity and group by categories |

COGNITIVE DASHBOARD ADJUSTMENT

BACKGROUND

The present invention relates generally to cognitive Graphical User Interface (GUI) adjustment, and more particularly to cognitive dashboard adjustment based on a user eye tracking and cohort related information.

Cognitive computing systems are systems configured to simulate the human thought process in a computerized model. A cognitive computing platform (CCP) mimics functions of the human brain and human senses. A CCP leverages various technological advancements such as, machine learning, reasoning, speech and image processing, human-computer interaction, and dialog and narrative generation in order to improve or substitute for human decision making.

A GUI is a type of user interface that allows a user to interact with an electronic device such as a computer through visual indicators presented on a display of the electronic device.

A dashboard is a visual report presented on a display of an electronic device that provides digital view of key performance indicators relevant to a particular objective or business process (e.g. sales, marketing, human resources, or production).

SUMMARY

Embodiments of the present invention provide a system, method, and program product for a cognitive dashboard adjustment. A computer determines a cognitive overload of a user interacting with a visual display based on eye tracking data. The visual display includes content of the dashboard and graphical elements of the content of the dashboard. The computer adjusts the visual display by modifying the content based on determining the cognitive overload.

DETAILED DESCRIPTION

A dashboard is a visual representation of data that may include key performance indicators relevant to a particular objective. A dashboard may be visualizes as a single component of the display. A dashboard may allow users to monitor, analyze and view the data and therefore may assist in decision making of the user. Typically, dashboard incorporates GUI components such as charts, texts and graphs of various colors and sized to convey the data that displayed on the dashboard represents in a way that is easy to understand. For example, data representing key performance indicators relevant to a particular objective may be displayed on a dashboard as a bar chart where each displayed bar is an independent GUI component that may be adjusted.

The dashboard is typically displayed on an output device of the computing device. For example, the dashboard may be presented on a display. Typically, the dashboard may be incorporated as a part of a web page. The dashboard includes GUI components that may be linked to different subsets of the data that are presented by the dashboard. In an example embodiment, changing the data may change the dashboard. For example, when the data is formatted as a table, changing or updating columns or rows of the table that are associated with GUI components of the dashboard would result in changes of the dashboard.

A GUI component of the dashboard has adjustable features. Changing the features of the GUI component may adjust visual effects such as colors, shapes, fonts and chart shapes. Changing the visual effects may assist a user to analyze and understand the dashboard. However, excessive use of visual effects of the GUI component features, such as contrasting colors or different font styles, may confuse the user and extend the time it takes for the user to understand the dashboard. In addition, the dashboard may be adjusted by manipulating or structuring the data that is presented by the dashboard. For example, content fields of an underlining data presented by the dashboard may be joined into one or more fields or split into groups, thus reducing the GUI components presented by the dashboard.

Tracking the point of gaze (while the user is observing the dashboard) may be converted to data and stored using an eye tracking device. The point of gaze may be determined by measuring angles of the eye rotation and converting them to a set of coordinates on a display. While the dashboard is presented to a user, an eye tracking device may assist in determining whether the user experiencing a cognitive overload due to excessive use of colors, fonts or GUI elements that are displayed in the dashboard. For example, if a dashboard displays a bar graph where each bar is displayed using GUI element with different feature that defines a different color, the user may experience confusion by subconsciously searching or assuming a meaning to different colors of each bar. The confusion may be a cognitive overload the user experiences while observing the dashboard.

Cognitive overload refers to exceeding an amount of mental effort being used in the working memory of the user. Typically, changing or adjusting features of GUI components of the dashboard may reduce the cognitive overload and decrease a time it takes to the user to understand the data represented by the dashboard. In other instances, combining, summarizing, excluding and/or reassigning the data to different GUI components may reduce the cognitive overload.

Embodiments of the present invention provide methods, systems, and computer program products for determining a cognitive overload based on eye tracking data and adjusting the dashboard to reduce the cognitive overload of a user. In addition, embodiments of the present invention may analyze related data, and adjust the dashboard according to the cohort related data. Cohort related data may be data related to a group of users such as users having a same occupation, or a same managerial position. For example, managers may prefer to view the dashboard as a colored pie graph while students prefer to see the same dashboard as a monochromatic bar graph.

Figure 1:
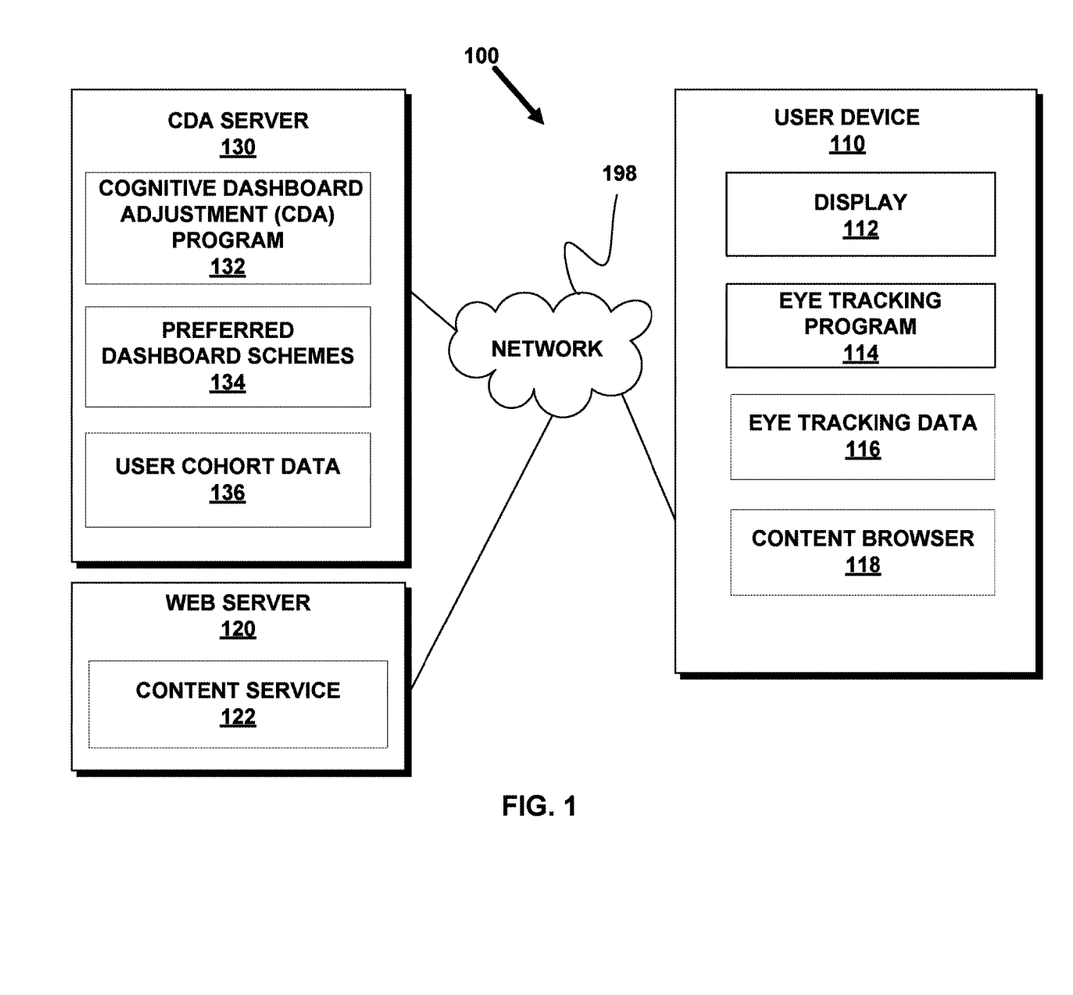
FIG. 1 illustrates a Cognitive Dashboard Adjustment (CDA) system, in accordance with an embodiment of the invention.

FIG. 1 illustrates pa CDA system 100 that is configured to display an adjusted dashboard that reduces a cognitive overload of a user. According to an example embodiment, a dashboard data may be transferred from a content service 122 to content browser 118 through CDA program 132 that adjusts GUI component features and the content (underlining data) of the dashboard. In an example embodiment, CDA system 100 may include user device 110, web server 120, and CDA server 130 interconnected via network 198.

In accordance with an embodiment of the invention, network 198 is the Internet, representing a worldwide collection of networks and gateways to support communications between devices connected to the Internet. Accordingly, network 198 may include, for example, wired, or wireless. In other embodiments, network 198 may be implemented as an intranet, a local area network (LAN), or a wide area network (WAN). In general, network 198 may be any combination of connections and protocols that will support communications between user device 110, web server 120, and CDA server 130.

According to an example embodiment, user device 110 represents a computing platform configured to display a dashboard on a visual display controlled by display 112 software and receive and analyze eye tracking data from eye tracking program 114. For example, user device 110 may be a mobile computer, a notebook, a laptop computer, a tablet computer, a handheld device, a smartphone, a thin client, or any other electronic device or computing system capable of exchanging data with content service 122 and CDA program 132 via network 198, and displaying dashboard via display 112 on a visual display. According to an example embodiment, user device 110 may include visual display components controlled by display 112 and eye tracking device components that are controlled by eye tracking program 114. In another embodiments, user device 110 may be configured to either incorporate all the software and hardware components of the visual display and the eye tracking device or control the visual display and the eye tracking device via network 198. According to an example embodiment, user device 110 may be configured to execute content browser 118 software and store data received from eye tracking program 114 in eye tracking data 116.

According to an example embodiment, display 112 may be a software component that controls an output device for presentation of data in visual or tactile (e.g. tactile electronic display for blind people) formats, such as a visual display. Display 112 may be incorporated in user device 110 or be a standalone software that is configured to display data from user device 110 via network 198. For example, display 112 may be an incorporated screen that is based on an Organic Light Emitting Diodes, Field Emission Display, Liquid Crystal Display or other technology allowing two or more dimensional displaying of a dashboard.

According to an example embodiment, eye tracking program 114 may be a software component that is configured to control a device that measures a rotation of the eyes of a user that is operating user device 110. The rotation of the eyes may be measured, for example, by recording an eye movement and determining a vector between the pupil center and a corneal reflection. The corneal reflection may be generated by an infrared light. After calibration, the angles and length of the vector may be transformed to a set of coordinates on a display. According to an example embodiment, eye tracking device may measure the rotation of eyes either optically, electrically or using eye attached objects such as contact lens. According to an example embodiment, eye tracking program 114 may be configured to record the data generated by the rotation of the eyes when the dashboard is displayed into an eye tracking data 116.

According to an example embodiment, eye tracking data 116 may be a database containing data that represents fixations of eyes on the dashboard that is displayed on display 112. Fixations are periods in which the eyes are motionless while observing a specific GUI component of the dashboard. For example, if the eyes of a user are motionless and the coordinates of the point of gaze fall within the coordinates of a GUI component of the dashboard, the user fixated on the GUI component. According to an example embodiment, fixation data may be used to measure the cognitive overload of a user while observing the dashboard. Fixation data may assist in determining whether the user experiences cognitive overload. Fixation may be characterized using three measures: fixation count, total number of fixations on a specific area of the dashboard, and fixation duration. In addition, a total fixation time on a specific area of the display where the dashboard is located and a first fixation time may be stored and analyzed for cognitive overload determination of the user. In further embodiments, additional parameters may be collected such as start time representing a first fixation on the dashboard.

Eye tracking data 116 may be a database organized in accounts where each account is associated with user identification information that includes identification parameters, user tracking data, user name, fixation count, fixation duration, first fixation time and fixation coordinates. For example, eye tracking data 116 may contain data as described in FIG. 2A (Table 1—Example of Eye Tracking Data).

Figure 2A:
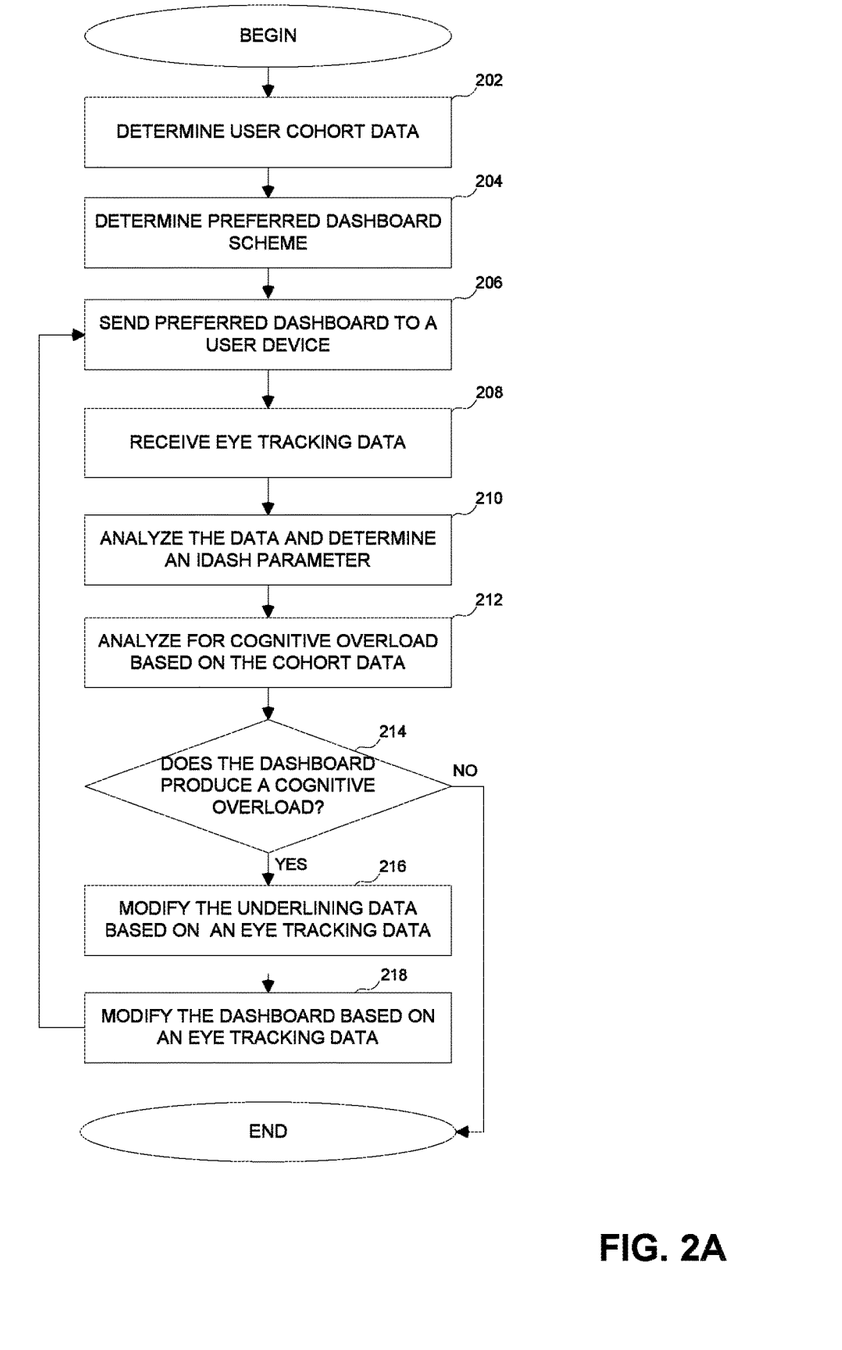
FIG. 2A is a flowchart illustrating operations of CDA program of FIG. 1, in accordance with an embodiment of the invention.
Figure 2B:
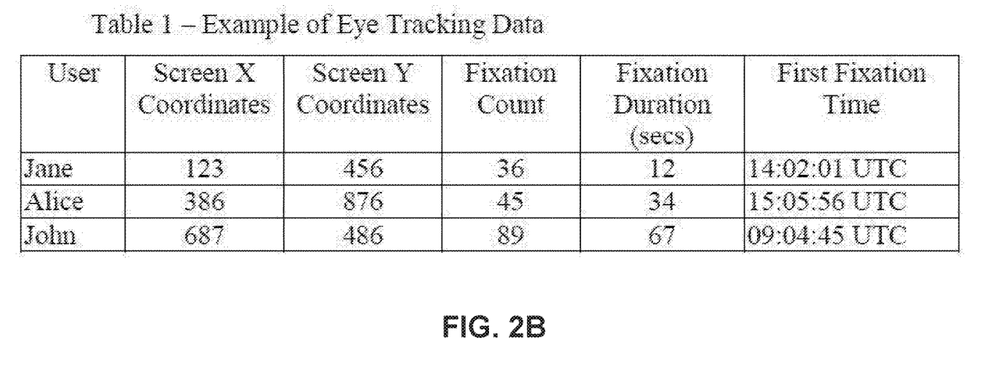
FIG. 2B is a table illustrating an example of eye tracking data 116 of FIG. 1, in accordance with an embodiment of the invention.

In another embodiment, eye tracking data 116 may include additional fields such as a user coefficient that represents sensitivity of the user to colors. For example, if the user is color blind the user coefficient may be a value representing the percentage of the user sensitivity to the colors (i.e. 0 may represent that the user is 100% color blinded). In another embodiment, user coefficient may represent the priority of the user over other users in the same cohort. A cohort may be a group of users bonded together or treated as a group. For example, the users may be assigned different cohort values representing different profession, different gender, different age groups or other differentiating factors. In another embodiments, eye tracking data 116 may include additional fields such as an iDash parameter (described below with respect to FIG. 2), user age, user gender, and other user cohort data.

According to an example embodiment, content browser 118 may be a software program configured to display data provided by content service 122 and CDA program 132 and convert the received data to a dashboard presented on display 112. In addition, content browser 118 may share data with eye tracking program 114 such as, for example, visual location and size of different GUI components of the dashboard on display 112.

According to an example embodiment, web server 120 represents a computing platform that may be configured to exchange data with user device 110 and CDA server 130 via network 198. For example, web server 120 may be a server, a desktop, a mobile computer, a notebook, a laptop computer, a tablet computer, a handheld device, a smartphone, a thin client, or any other electronic device or computing system capable of exchanging data with content browser 118 software, CDA program 132, via network 198. According to an example embodiment, web server 120 may execute a content service 122 software.

According to an example embodiment, content service 122 is a software program that may be configured to exchange data with CDA program 132 and content browser 118 via network 198. For example, content service 122 may be a web server software, a file server software or any other software that is capable of exchanging data that may be transformed into a dashboard that is displayed on display 112 of user device 110.

According to an example embodiment, CDA server 130 represents a computing platform that may be configured to exchange data with user device 110 and web server 120 via network 198. According to an example embodiment, CDA server 130 may be configured to execute CDA program 132, manage preferred dashboard schemes 134, and user cohort data 136. For example, CDA server 130 may be a server, a desktop, a mobile computer, a notebook, a laptop computer, a tablet computer, a handheld device, a smartphone, a thin client, or any other electronic device or computing system.

According to an example embodiment, user cohort data 136 may be a database that may be controlled by CDA program 132. User cohort data 136 may be a database that includes information related to users that requested to view a dashboard on user device 110. User cohort data 136 may include fields such as, for example, name of the user, user identification number, user identification, and user cohort data such as user occupation, user position, or other user cohort identifier. In another embodiments, user cohort data 136 may be located on other server and accessed by CDA program 132 via network 198. For example, cohort data 136 may be located on a social server or corporate employee server and accessed via network 198.

According to an example embodiment, preferred dashboard schemes 134 may be a database that is controlled by CDA program 132 and stored on CDA server 130. Preferred dashboard schemes 134 may include fields related to various cohorts and their preferences in viewing a dashboard. For example, managers may prefer to view the dashboards in a pie format while computer scientists prefer to view the dashboard as a bar graphs. In addition, preferred dashboard schemes 134 may include fields such as, cohort preferred size of the dashboard, and other cohort preferred GUI component features requirements. In another embodiment, preferred dashboard schemes 134 may include fields that define the cohort preferred content changes of the dashboard data. For example, managers may prefer that only summaries of all the fields (i.e. total car sales) will be presented without displaying each field independently (i.e. specific model of the car sales).

According to an example embodiment, CDA program 132 is a software program that may be executed on CDA server 130. CDA program 132 may be configured to receive a dashboard, determine user cohort related data, update the dashboard based on user related cohort data from user cohort data 136 and display it to a user. In addition, CDA program 132 may collect user eye tracking data and determine whether the user experiences a cognitive overload. If the user experiences a cognitive overload, CDA program 132 may adjust the dashboard to reduce the cognitive overload. The operations and functions of CDA program 132 are described in further detail below with regard to FIG. 2.

FIG. 2 is a flowchart illustrating the operations of CDA program 132, in accordance with an embodiment of the invention. Referring to step 202, CDA program 132 determines user cohort data. According to an example embodiment, CDA program 132 may identify user cohort data from user cohort data 136. For example, CDA program 132 may receive user identification number from user device 110 and identify the parameters related to the identification number from the user cohort data 136.

Referring to step 204, CDA program 132 determines preferred dashboard scheme. According to an example embodiment, CDA program 132 may access preferred dashboard schemes 134 and locate a preferred cohort related dashboard scheme based on the similarities between the user and the specific cohort. For example, if a user of user device is identified as a car sales person in user cohort data 136, then CDA program 132 may load the preferred format for the dashboard from preferred dashboard schemes related to car sales persons.

Referring to step 206, CDA program 132 sends the preferred dashboard to user device 110. According to an example embodiment, CDA program 132 may apply the preferred dashboard scheme to a dashboard and send it to content browser 118 for displaying. In another embodiment, CDA program 132 may send the preferred dashboard scheme to content browser 118, which may apply the scheme to the dashboard. In another embodiment, a user may select whether to display the dashboard after applying the preferred dashboard scheme or to display the dashboard in an original format.

Referring to step 208, CDA program 132 receives eye tracking data from user device 110. According to an example embodiment, eye tracking program 114 may collect eye tracking data and record it in eye tracking data 116. CDA program 132 may access the data stored in eye tracking data 116. In another embodiment, content browser 118 may send eye tracking data to CDA program 132.

Referring to step 210 CDA program 132 analyzes the eye tracking data and determines an iDash parameter. According to an example embodiment, the iDash parameter may represent whether the dashboard causes a cognitive overload and may be used to adjust the dashboard to reduce the cognitive overload of the user. According to an example embodiment, CDA program 132 analyzes eye tracking data that may include a set of coordinates where fixation occurred, a fixation count, fixation duration, and first fixation time. According to an example embodiment CDA program 132 may calculate the iDash parameter. The iDash parameter may be calculated using an equation such as iDash=A+B(Fixation Count)+C(X coordinate)+D(Y coordinate)+E(user coefficient). For example, iDash equation may be iDash=1.456+0.4456(Fixation Count)+0.1558(X coordinate)−0.0011(Y coordinate)+0.5676(user coefficient) where Fixation Count represents the number of fixations, X and Y coordinates represent coordinates on the screen where fixation occurred, and user coefficient may be a user provided color blindness coefficient.

Referring to step 212, CDA program 132, analyzes the data for cognitive overload based on the cohort data. According to an example embodiment, CDA program 132 may compare the eye tracking data of a user with other users. For example, CDA program 132 may compare the iDash parameter of the user with an average iDash parameter calculated from user cohort data 136 in order to determine whether the user experiences a cognitive overload.

Referring to decision 214, CDA program 132 determines whether the dashboard produces a cognitive overload. According to an example embodiment CDA program 132 may compare a calculated iDash value to a specific range that determines a level of cognitive overload. For example, CDA program 132 may determine the level of cognitive overload and action to be taken based on Table 2 described in FIG. 2C (Table 2—Example of Cognitive Overload Table). In another embodiment, CDA program 132 may compare the calculated iDash value to the average iDash value determined from user cohort data and perform an action from Table 2 based on the calculated iDash value is above the iDash value determined from user cohort data by a defined value. In further embodiments, CDA program 132 may determine a cognitive overload by comparing only fixation count and/or fixation duration to corresponding data from user cohort data 136.

Figure 2C:
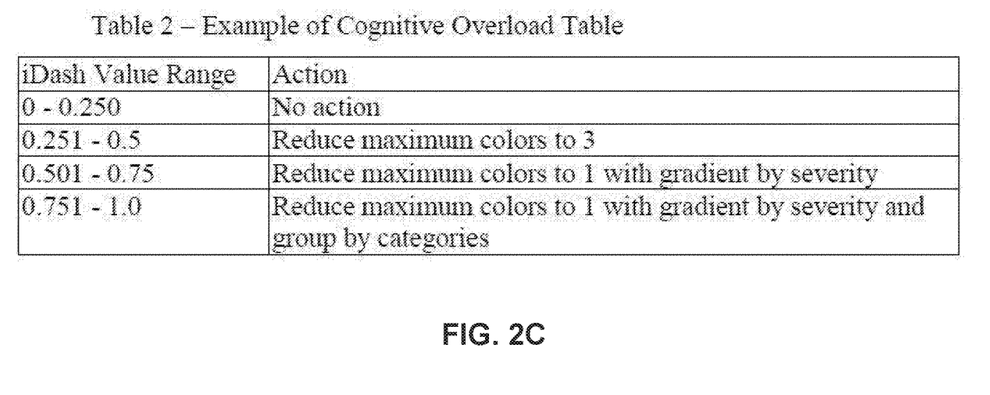
FIG. 2C is a table illustrating an example of cognitive overload ranges and action to be taken by CDA program of FIG. 1, in accordance with an embodiment of the invention.

Referring to decision 214, CDA program 132 determines whether the dashboard creates a cognitive overload. According to an example embodiment, CDA program 132 determines that the dashboard creates a cognitive overload whenever the iDash parameter exceeds the value of 0.250 (See Table 2—Cognitive Overload Table). If the dashboard creates a cognitive overload (decision 214, "YES" branch), CDA program 132 proceeds to step 216. If the dashboard does not create a cognitive overload (decision 214, "No" branch), CDA program 132 ends the execution.

Referring to step 216, CDA program 132 modifies the underlining data based on eye tracking data. According to an example embodiment, CDA program 132 may change the underlining data of the dashboard based on an action corresponding to an iDash value (See Table 2—Cognitive Overload Table). For example, if the calculated iDash value is above 0.751, CDA program 132 modifies the underlining data of the dashboard. According to an example embodiment, the underlining data may be a table and/or a database linked to the dashboard. For example in order to visually group the presentation of different fields of the dashboard, underlining data represented by the dashboard may be changed. Data that is used by the dashboard may be rearranged or grouped by categories. For example, CDA program 216 may sum up data fields and substitute it with the existing fields using, for example, pandas. Pandas is a software library written for the Python (Python is a registered trademark of Python Software Foundation non-profit corporation) programming language for data manipulation and analysis. In another embodiment, CDA program 132 may update the preferred dashboard schemes 134 in order that the preferred scheme will manipulate the data according to the user.

Referring to step 218, CDA program 132 modifies the dashboard based on eye tracking data. According to an example embodiment, CDA program 132 may change the GUI component features of the dashboard based on an action corresponding to the iDash value (See Table 2—Cognitive Overload Table). For example, if the iDash value is within a range of 0.251-0.5, CDA program 132 modifies the colors of the GUI components of the dashboard to a maximum of 3 different colors. According to an example embodiment, CDA program 132 may adjust the colors of the GUI components of the dashboard by determining the preferred colors from cohort related data from preferred dashboard schemes 134.

Figure 3:
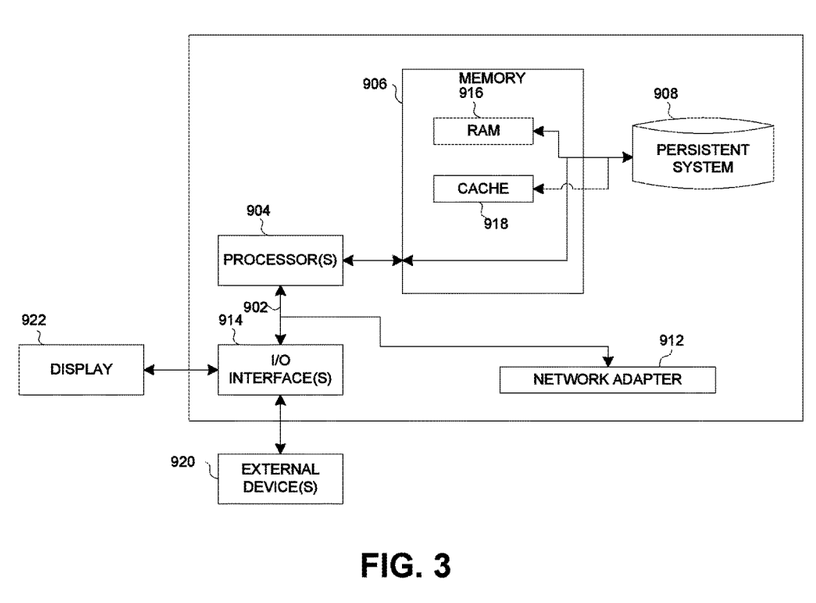
FIG. 3 is a block diagram depicting the hardware components of the CDA system 100 of FIG. 1, in accordance with an embodiment of the invention.

FIG. 3 depicts a block diagram of components of user device 110, web server 120, and CDA server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A user device 110, web server 120, and CDA server 130 include communications fabric 902, which provides communications between computer processor(s) 904, memory 906, persistent system 908, network adapter 912, and input/output (I/O) interface(s) 914. Communications fabric 902 may be implemented with any architecture designed for passing data and/or control information between processors (such as microprocessors, communications and network processors, etc.), system memory, peripheral devices, and any other hardware components within a system. For example, communications fabric 902 may be implemented with one or more buses.

Memory 906 and persistent system 908 are computer-readable storage media. In this embodiment, memory 906 includes random access memory (RAM) 916 and cache memory 918. In general, memory 906 may include any suitable volatile or non-volatile computer-readable storage media.

A CDA program 132, content service 122, and content browser 118 are stored in persistent system 908 for execution by one or more of the respective computer processors 904 via one or more memories of memory 906. In this embodiment, persistent system 908 includes a magnetic hard disk drive. Alternatively, or in addition to a magnetic hard disk drive, persistent system 908 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent system 908 may also be removable. For example, a removable hard drive may be used for persistent system 908. Other examples include optical and magnetic disks, thumb drives, and smart cards that are inserted into a drive for transfer onto another computer-readable storage medium that is part of persistent system 908.

Network adapter 912, in these examples, provides for communications with other data processing systems or devices. In these examples, network adapter 912 includes one or more network interface cards. Network adapter 912 may provide communications using one or both of physical and wireless communications links. A CDA program 132, content service 122, and content browser 118 may be downloaded to persistent system 908 through network adapter 912.

I/O interface(s) 914 allows for input and output of data with other devices that may be connected to user device 110, web server 120, and CDA server 130. For example, I/O interface 914 may provide a connection to external devices 920 such as a keyboard, keypad, a touch screen, and/or some other suitable input device. External devices 920 may also include portable computer-readable storage media such as, for example, thumb drives, portable optical or magnetic disks, and memory cards. Software and data used to practice embodiments of the present invention, e.g., CDA program 132, content service 122, and content browser 118 may be stored on such portable computer-readable storage media and may be loaded onto persistent system 908 via I/O interface(s) 914. I/O interface(s) 914 may also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
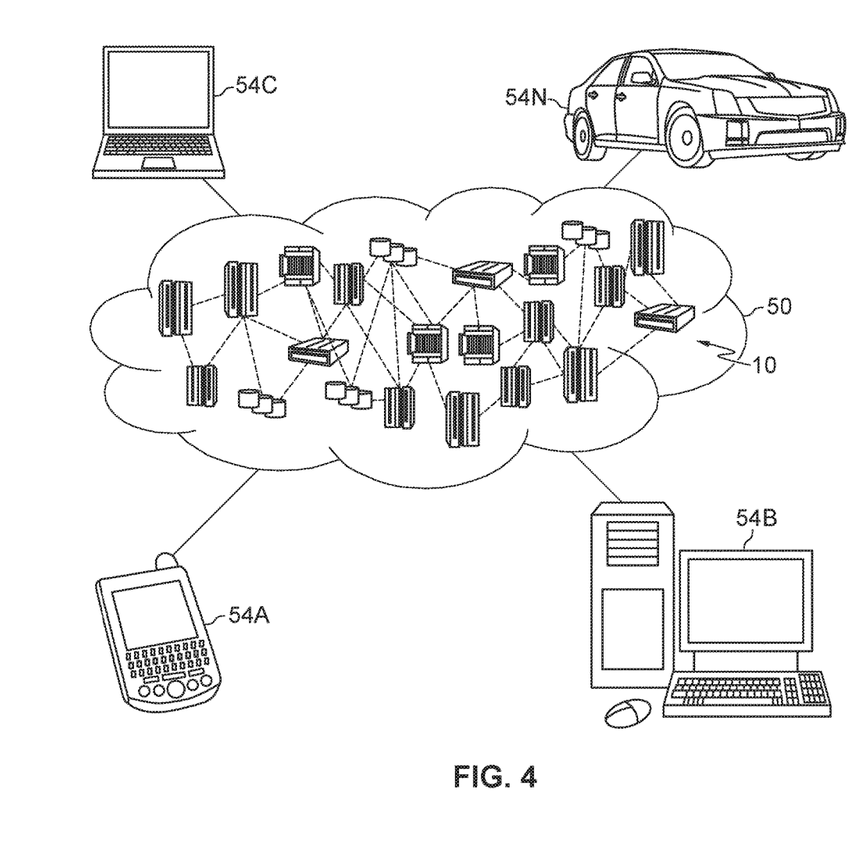
FIG. 4 depicts a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 may communicate with any type of computerized device over any type of network and/or network addressable connection (e.g., using a web browser).

Figure 5:
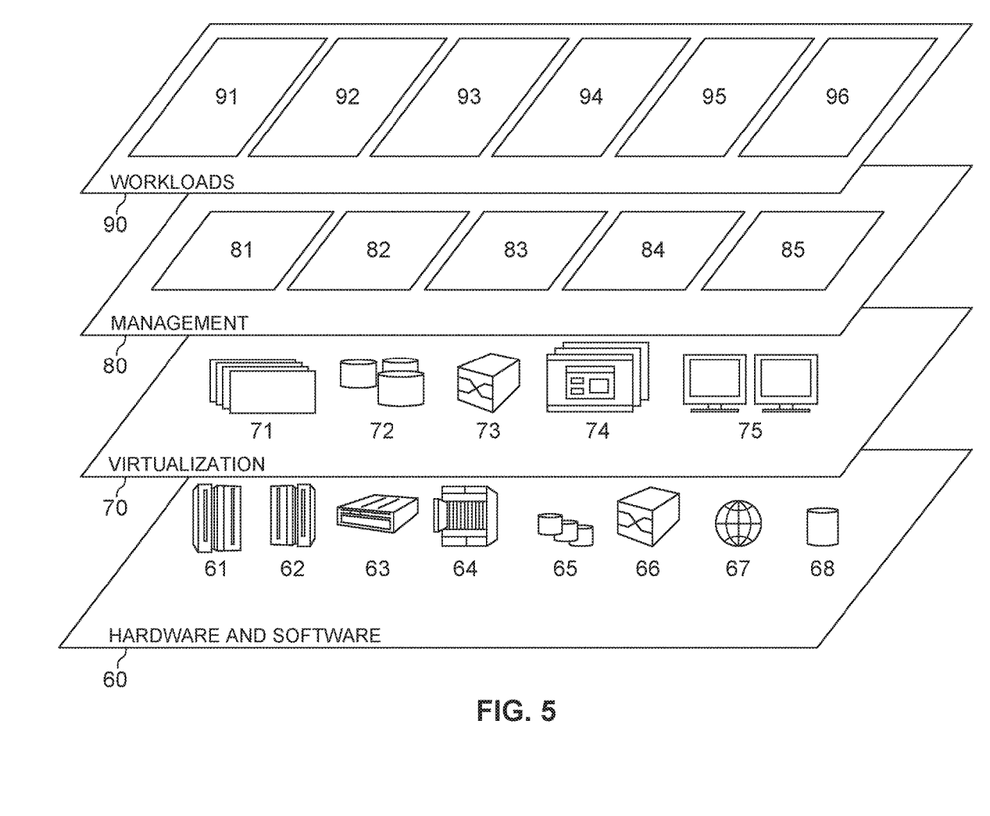
FIG. 5 depicts abstraction model layers, in accordance with an embodiment of the invention.

Referring now to FIG. 5, a set of functional abstraction layers provided by cloud computing environment 50 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive dashboard adjustment 96. A cognitive dashboard adjustment 96 may relate to functionality that analyzes and tracks the point of gaze of the user and by coupling with cohort related data adjusts the dashboard in order to decrease a cognitive overload.

What is claimed is:

1. A method for cognitive adjustment of a dashboard, the method comprising:
    capturing eye tracking data with an eye tracking device that measures a rotation of one or more eyes of a user operating the eye tracking device, and wherein the rotation is measured by recording an eye movement and determining a vector between a pupil center and a corneal reflection, and wherein the corneal reflection is generated by infrared light;
    determining a cognitive overload of a user interacting with a visual display, wherein the cognitive overload is calculated based on eye tracking data, and wherein the visual display includes content of the dashboard and graphical elements of the content of the dashboard, and wherein the cognitive overload is calculated based on an iDash parameter determined by an equation, wherein the equation is iDash=1.456+0.4456(Fixation Count)+0.1558(X coordinate)−0.0011(Y coordinate)+0.5676(user coefficient), wherein a Fixation Count represents a number of fixations, one or more pairs of X and Y coordinates represent coordinates on the visual display where each fixation from the fixation count occurred, and a user coefficient is a user-provided color blindness coefficient; and
    based on determining the cognitive overload, adjusting the visual display, wherein adjusting the visual display comprises modifying the content, wherein modifying the content comprises an action selected from a group consisting of:
        joining one or more fields of the content together;
        splitting a field of the content into multiple fields; and
        removing the one or more fields from the content.

2. The method of claim 1, wherein adjusting the visual display further comprises adjusting the graphical elements illustrating the content.

3. The method of claim 1, further comprising:
    determining cohort related data of the user based on similarities between the user and a cohort of users;
    determining a preferred dashboard scheme based on the determined similarities between the user and the cohort of users;
    adjusting the visual display based on the preferred dashboard scheme.

4. The method of claim 1, further comprising calculating an iDash value based on the eye tracking data, wherein the eye tracking data comprises a user coefficient, a fixation state of a view of the user, a fixation point of the view of the user, a fixation duration of the view of the user, and a fixation count of the view of the user.

5. A computer program product for cognitive adjustment of a dashboard, comprising:
    one or more tangible computer-readable storage devices and program instructions stored on at least one of the one or more tangible computer-readable storage devices, the program instructions comprising:
        program instructions to capture eye tracking data with an eye tracking device that measures a rotation of one or more eyes of a user operating the eye tracking device, and wherein the rotation is measured by recording an eye movement and determining a vector between a pupil center and a corneal reflection, and wherein the corneal reflection is generated by infrared light;
        program instructions to determine a cognitive overload of a user interacting with a visual display, wherein the cognitive overload is calculated based on eye tracking data, and wherein the visual display includes content of the dashboard and graphical elements of the content of the dashboard, and wherein the cognitive overload is calculated based on an iDash parameter determined by an equation, wherein the equation is iDash=1.456+0.4456(Fixation Count)+0.1558(X coordinate)−0.0011(Y coordinate)+0.5676(user coefficient), wherein a Fixation Count represents a number of fixations, one or more pairs of X and Y coordinates represent coordinates on the visual display where each fixation from the fixation count occurred, and a user coefficient is a user-provided color blindness coefficient; and
        based on determining the cognitive overload, program instructions to adjust the visual display, wherein program instructions to adjust the visual display comprises program instructions to modify the content, wherein modifying the content comprises an action selected from a group consisting of:
        program instructions to join one or more fields of the content together;
        program instructions to split a field of the content into multiple fields; and
        program instructions to remove the one or more fields from the content.

6. The computer program product of claim 5, wherein program instructions to adjust the visual display further comprises program instructions to adjust the graphical elements illustrating the content.

7. The computer program product of claim 5, further comprising:
program instructions to determine cohort related data of the user based on similarities between the user and a cohort of users;
program instructions to determine a preferred dashboard scheme based on the determined similarities between the user and the cohort of users;
program instructions to adjust the visual display based on the preferred dashboard scheme.

8. The computer program product of claim 5, further comprising program instructions to calculate an iDash value based on the eye tracking data, wherein the eye tracking data comprises a user coefficient, a fixation state of a view of the user, a fixation point of the view of the user, a fixation duration of the view of the user, and a fixation count of the view of the user.

9. A computer system for cognitive adjustment of a dashboard, the method comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to capture eye tracking data with an eye tracking device that measures a rotation of one or more eyes of a user operating the eye tracking device, and wherein the rotation is measured by recording an eye movement and determining a vector between a pupil center and a corneal reflection, and wherein the corneal reflection is generated by infrared light;
program instructions to determine a cognitive overload of a user interacting with a visual display, wherein the cognitive overload is calculated based on eye tracking data, and wherein the visual display includes content of the dashboard and graphical elements of the content of the dashboard, and wherein the cognitive overload is calculated based on an iDash parameter determined by an equation, wherein the equation is iDash=1.456+0.4456(Fixation Count)+0.1558(X coordinate)−0.0011(Y coordinate)+0.5676(user coefficient), wherein a Fixation Count represents a number of fixations, one or more pairs of X and Y coordinates represent coordinates on the visual display where each fixation from the fixation count occurred, and a user coefficient is a user-provided color blindness coefficient; and
based on determining the cognitive overload, program instructions to adjust the visual display, wherein program instructions to adjust the visual display comprises program instructions to modify the content, wherein modifying the content comprises an action selected from a group consisting of:
program instructions to join one or more fields of the content together;
program instructions to split a field of the content into multiple fields; and
program instructions to remove the one or more fields from the content.

10. The computer system of claim 9, further comprising:
program instructions to determine cohort related data of the user based on similarities between the user and a cohort of users;
program instructions to determine a preferred dashboard scheme based on the determined similarities between the user and the cohort of users;
program instructions to adjust the visual display based on the preferred dashboard scheme.

11. The computer system of claim 9, further comprising program instructions to calculate an iDash value based on the eye tracking data, wherein the eye tracking data comprises a user coefficient, a fixation state of a view of the user, a fixation point of the view of the user, a fixation duration of the view of the user, and a fixation count of the view of the user.

* * * * *